(12) United States Patent
Gerard et al.

(10) Patent No.: US 6,223,344 B1
(45) Date of Patent: Apr. 24, 2001

(54) APPARATUS AND METHOD FOR VERSIONING PERSISTENT OBJECTS

(75) Inventors: Scott Neal Gerard; Steven Lester Halter; Steven J. Munroe; Erik E. Voldal, all of Rochester, MN (US)

(73) Assignee: Internationl Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/096,132

(22) Filed: Jun. 11, 1998

(51) Int. Cl.$^7$ .................................................. G06F 9/445
(52) U.S. Cl. ............................ 717/11; 707/103; 707/102
(58) Field of Search ............................ 395/712; 707/103, 707/102; 703/6; 717/11

(56) References Cited

U.S. PATENT DOCUMENTS

| | | | | |
|---|---|---|---|---|
| 5,488,721 | * | 1/1996 | Rich et al. | 707/103 |
| 5,535,389 | * | 7/1996 | Elder et al. | 395/712 |
| 5,613,099 | * | 3/1997 | Erickson et al. | 395/500 |
| 5,664,182 | * | 9/1997 | Nierenberg et al. | 707/102 |
| 5,701,472 | * | 12/1997 | Koerber et al. | 707/203 |
| 5,729,739 | * | 3/1998 | Cantin et al. | 707/103 |
| 5,797,007 | * | 8/1998 | Erickson et al. | 395/683 |
| 5,809,507 | * | 9/1998 | Cavanaugh, III | 707/103 |
| 5,862,386 | * | 1/1999 | Joseph et al. | 395/712 |
| 5,870,753 | * | 2/1999 | Chang et al. | 707/103 |
| 6,023,704 | * | 2/2000 | Gerard et al. | 707/103 |
| 6,058,416 | * | 5/2000 | Mukherjee et al. | 709/203 |
| 6,063,128 | * | 5/2000 | Bentley et al. | 703/6 |

* cited by examiner

Primary Examiner—Kakali Chaki
Assistant Examiner—Chameli Chaudhuri Das
(74) Attorney, Agent, or Firm—Schmeiser, Olsen & Watts LLP (57) ABSTRACT

The present invention provides a method and apparatus for versioning persistent objects which updates the version of a persistent object by splitting the persistent object up into two sections, a header section and a data section. The header section has a data pointer to the data section. The header section determines the object identity of the persistent object and always remains in place. Since the header section of the object always remains intact, the object identity of the persistent object never changes. When updating the version of the persistent object, the persistent object versioning mechanism simply updates the pointer in the header section of the object to reference a newly created data section. Once the persistent object versioning mechanism updates the data pointer to reference the new data section, existing objects can reference the new version of the persistent object using the original object identity of the persistent object.

34 Claims, 6 Drawing Sheets

APPARATUS AND METHOD FOR VERSIONING PERSISTENT OBJECTS

BACKGROUND OF THE INVENTION

1. Technical Field

This invention generally relates to object-oriented programming and more specifically relates to managing version changes in object-oriented environments.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware (e.g., semiconductors, circuit boards, etc.) and software (e.g., computer programs). As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to develop and produce.

One way in which the performance of application software programs has been improved while the associated development costs have been reduced is by using object-oriented programming concepts. The goal of using object-oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved. Closely connected with objects is the concept of "classes" of objects. A class is a formalized definition of a set of like objects. As such, a class can be thought of as an abstraction of the objects or as a definition of a type of object. Each object that is created in an object-oriented system is an instance of a particular class.

Typically, object-oriented application software programs or processes create and use objects to accomplish the required or desired goals of the application software. The objects that accomplish the required tasks for a given software process typically interact with other objects as part of the process. For example, a "client object" is an object that will request a certain service from another object, known as a "server object." The server object will receive the request from the client object and take appropriate steps to fill the client object's request. These software processes create an object or group of objects and then use those objects during the lifetime of that particular process. In general, at the end of the process which created the object, the object is removed from memory and will cease to exist. However, certain types of objects, called long-lived objects or "persistent" objects, will exist beyond the lifetime of the process that created the object and will be accessible by other, independent processes.

Persistent objects usually contain "persistent" data. Persistent data is any data that must exist beyond the lifetime of the process which created it. Although persistent objects are removed from memory when the process which created them is finished, persistent objects and persistent data may be saved on some secondary storage media and can be reconstructed for use at a later time, if and when the object is needed. Persistent objects can be saved on any of several different types of secondary storage media including hard disks, floppy disks or magnetic tape.

The number of accessible persistent objects is not limited to the number of objects that can be created by one process. As mentioned above, one object that has been created by a first process can call procedures or "methods" on other objects that have been created by other, independent processes. Given that many different processes may create and use persistent objects, the number of persistent objects that are accessible in a given object-oriented environment may grow dramatically over time. The collection of objects containing persistent data maintained by an object-oriented system can easily grow to encompass millions of objects.

While the introduction and implementation of object-oriented programming concepts has been mostly beneficial, the use of object-oriented concepts in client/server environments is not without certain limits and, occasionally, undesirable side effects. For example, as the requirements and functions of a given computer system develop over a period of time, the nature of certain aspects of the computer system may change or gradually evolve. The explanation below illustrates one problem associated with using object-oriented solutions when system requirements change and/or evolve.

Specialized classes of objects are frequently created to store any necessary data that may be required for the system to perform the functions for which it was created. As time passes, the type and quantity of information stored by these specialized objects may need to be changed or enhanced to accommodate additional or different data types. In this case, the definition of the class that defines the object will, of necessity, be changed to support the new object data storage requirements. This scenario typically occurs when a software application is upgraded from a first version to a newer, more powerful version of the software application. The processes and activities associated with modifying, updating, and tracking changes to a class definition over a period of time are known as "versioning."

Generally, an object version is updated by the simple method of shutting down the application, installing the new version or description of the class, restarting the application, and rebuilding the object instances from the new class description. The objects which belong to the new class become instances of the new class version. This method of updating the version of objects is very straightforward. However, several problems exist when updating the version of a persistent object via this method.

The versioning method described above, which is typically used with regular objects that do not contain persistent data (herein called non-persistent objects), cannot be efficiently applied to systems containing persistent objects. It is simply not practical to modify and rebuild each persistent object when the number of persistent objects may reach into the millions. The time and system overhead required to rebuild all of the objects can be overwhelming.

Further, existing related objects may reference the persistent object. Existing objects typically reference a persistent object using the object identity associated with the persistent object at the time it was created. As previously mentioned, typical versioning methods simply rebuild the new version of the object, which usually involves creating a new object with a new object identity at the time the object is created. However, with persistent objects, the new version of the persistent object must have the same object identity as the original version of the persistent object so that all previously established references to the persistent object by related objects remain valid.

Without a mechanism for versioning objects containing persistent data, the use of persistent objects will be limited in application and organizations that utilize distributed object systems will not fully realize the available benefits of persistence and object-oriented programs in distributed object environments.

SUMMARY OF THE INVENTION

According to the present invention, a method and apparatus for versioning persistent objects updates the version of a persistent object by using two sections of the persistent object, a header section and a data section. The header section has a data pointer which "points" to or references the data section. The header section contains the object identity of the persistent object and always remains in place. Since the header section always remains in place, the object identity of the persistent object never changes. When updating the version of the persistent object, the persistent object versioning mechanism simply updates the pointer in the header section of the object to reference a newly created data section. Once the persistent object versioning mechanism updates the data pointer to reference the new data section, existing objects can reference the new version of the persistent object using the original object identity of the persistent object, even if the location and contents of the data section have been changed.

BRIEF DESCRIPTION OF DRAWINGS

The preferred exemplary embodiments of the present invention will hereinafter be described in conjunction with the appended drawings, where like designations denote like elements, and.

BEST MODE FOR CARRYING OUT THE INVENTION

The present invention relates to object-oriented programming techniques. For those individuals who are not generally familiar with object-oriented programming, the Overview section below presents many of the basic concepts and terminology that will help to understand the invention. Individuals skilled in the art of object-oriented programming may wish to skip this section and proceed directly to the Detailed Description section of this specification.

1. Overview

Object-oriented Technology v. Procedural Technology

Object-oriented programming is a method of program implementation in which programs are organized as cooperative collections of objects, each of which represents an instance of some class, and whose classes are all members of a hierarchy of classes united via inheritance relationships. Object-oriented programming differs from standard procedural programming in that it uses objects, not algorithms, as the fundamental building blocks for creating computer programs. This difference stems from the fact that the design focus of object-oriented programming technology is wholly different than that of procedural programming technology.

The focus of procedural-based design is on the overall process used to solve the problem; whereas the focus of object-oriented design is on casting the problem as a set of autonomous entities that can work together to provide a solution. The autonomous entities of object-oriented technology are, of course, objects. Object-oriented technology is significantly different from procedural technology because problems are broken down into sets of cooperating objects instead of into hierarchies of nested computer programs or procedures.

Thus, a pure object-oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what service to perform.

Another central concept in object-oriented programming is the "class." A class is a template or prototype that defines a type of object. A class outlines the makeup of objects that belong to that class. By defining a class, objects can be created that belong to the class without having to rewrite the entire definition for each new object as it is created. This feature of object-oriented programming promotes the reusability of existing definitions and promotes efficient use of program code.

There are many computer languages that presently support object-oriented programming techniques. For example, Smalltalk, Object Pascal, C++ and Java are all examples of programming languages that support object-oriented programming.

2. Detailed Description

The present invention provides a versioning mechanism which allows a persistent object to be updated or changed to a new version while allowing existing object references to the persistent object to remain valid.

Figure 1:
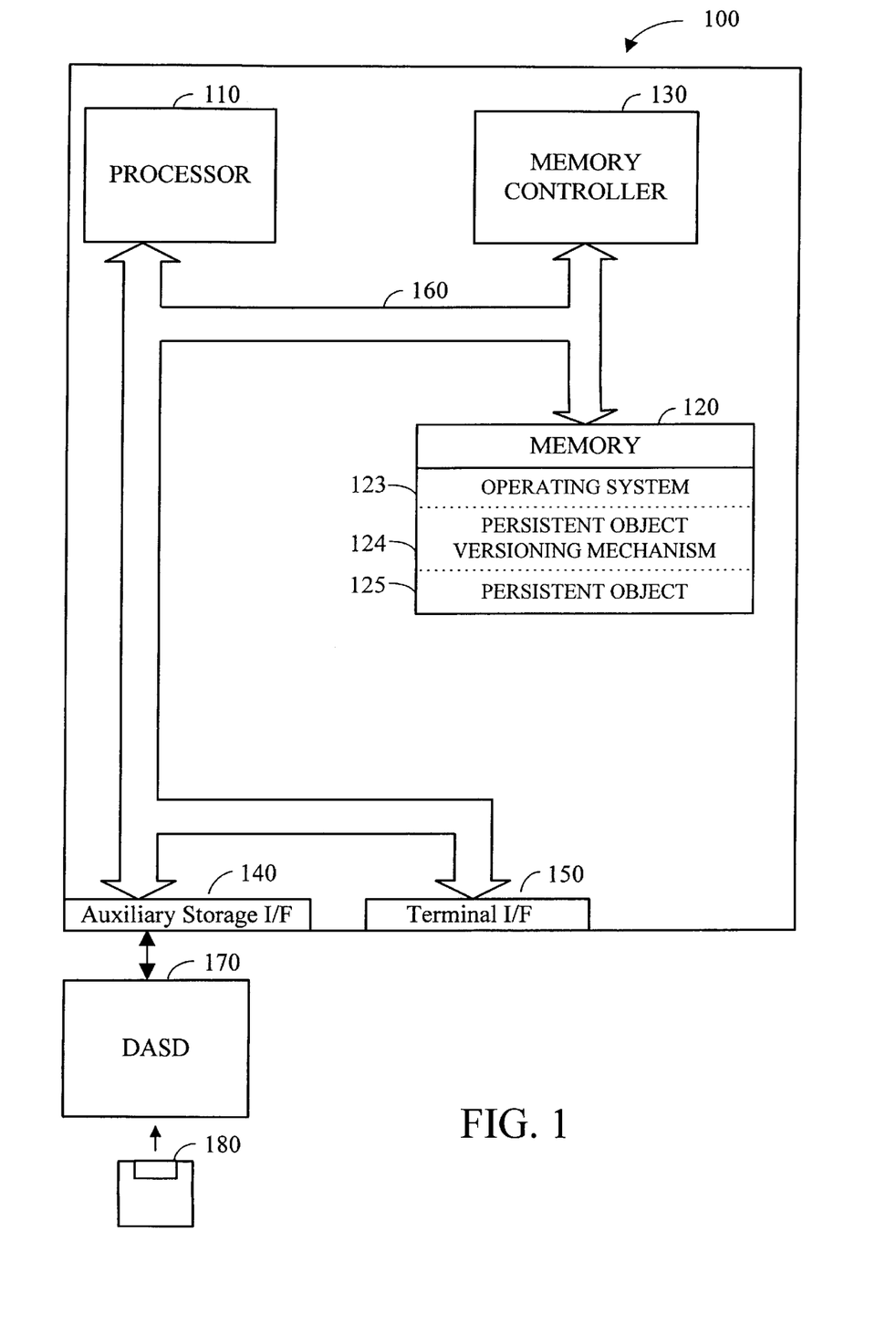
FIG. 1 is a block diagram of a computer system in accordance with a preferred embodiment of the present invention.

Referring now to FIG. 1, a computer system in accordance with a preferred embodiment of the present invention includes: a Central Processing Unit (CPU) 110; a terminal interface 150; an auxiliary storage interface 140; a Direct Access Storage Device (DASD) 170; a floppy disk 180; a bus 160; and a memory 120. In this example, memory 120 includes: an operating system 123; a persistent object versioning mechanism 124; and a persistent object 125. It should be understood that bus 160 is used to load persistent object versioning mechanism 124 into memory 120 for execution.

CPU 110 performs computation and control functions of system 100. The CPU 110 associated with system 100 may comprise a single integrated circuit, such as a microprocessor, or may comprise any suitable number of integrated circuit devices and/or circuit boards working in cooperation to accomplish the functions of a central processing unit. CPU 110 is capable of suitably executing the programs contained within memory 120 and acting in response to those programs or other activities that may occur in system 100.

Memory 120 is any type of memory known to those skilled in the art. This would include Dynamic Random Access Memory (DRAM), Static RAM (SRAM), flash memory, cache memory, etc. While not explicitly shown in FIG. 1, memory 120 may be a single type of memory component or may be composed of many different types of memory components. In addition, the functions of memory 120 and CPU 110 may be distributed across several different computers that collectively comprise system 100. Computer system 100 of FIG. 1 simply illustrates many of the salient features of the invention, without limitation regarding the physical location of CPU 110 or memory locations within memory 120. In addition, although persistent object 125 is shown to reside in the same memory location as operating system 123, it is to be understood that memory 120 may consist of disparate memory locations.

Bus 160 serves to transmit programs, data, status, and other forms of information or signals between the various components of system 100. The preferred embodiment for bus 160 is any suitable physical or logical means of connecting computer systems and components known to those skilled in the art. This includes, but is not limited to, direct hard-wired connections, Internet connections, Intranet connections, fiber optics, infrared (IR) and other forms of wireless connections. It is anticipated that many alternative methods and material for connecting computer systems and components will be readily adapted for use with the present invention. This would include those methods and materials not presently known but developed in the future.

Terminal interface 150 allows human users to communicate with system 100. Auxiliary storage interface 140 represents any method of interfacing a storage apparatus to a computer system known to those skilled in the art. Auxiliary storage interface 160 allows auxiliary storage devices such as DASD 170 to be attached to and communicate with the other components of system 100. While only one auxiliary storage interface 160 is shown, the present invention anticipates multiple interfaces and multiple auxiliary storage devices such as DASD 170. As shown in FIG. 1, DASD 170 may be a floppy disk drive which is capable of reading and writing programs or data on disk 180. DASD 170 may also be any other type of DASD known to those skilled in the art. This would include floppy disk drives, CD-ROM drives, hard disk drives, optical drives, etc. Disk 180 represents the corresponding storage medium used with DASD 170. As such, disk 180 can comprise a typical 3.5 inch magnetic media disk, an optical disk, a magnetic tape or any other type of storage medium.

Operating system 123 is any operating system suitable for controlling system 100. Persistent object 125 is any persistent object created and/or maintained by system 100. Persistent object versioning mechanism 124 resides in a memory location and is responsible for making changes to support object persistence as new versions of objects are created. The functionality of persistent object versioning mechanism 124 will be explained in further detail below.

It is important to note that while the present invention has been (and will continue to be) described in the context of a fully functional computer system, those skilled in the art will appreciate that the mechanisms of the present invention are capable of being distributed as a program product in a variety of forms, and that the present invention applies equally regardless of the particular type of signal bearing media to actually carry out the distribution. Examples of signal bearing media include: recordable type media such as floppy disks (e.g., disk 180) and CD ROMS, and transmission type media such as digital and analog communication links, including wireless communication links.

Figure 2A:
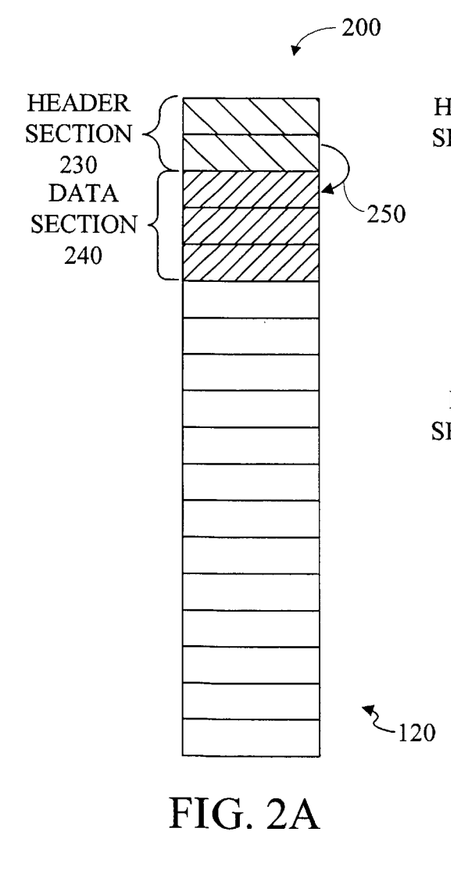
FIGS. 2A–2C are block diagram that depicts a persistent object before versioning, after a first version update, and after a second version update.
Figure 2B:
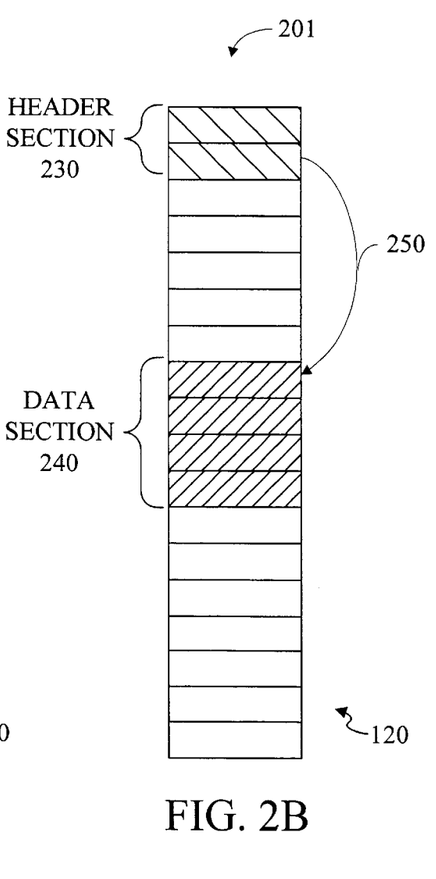
Figure 2C:
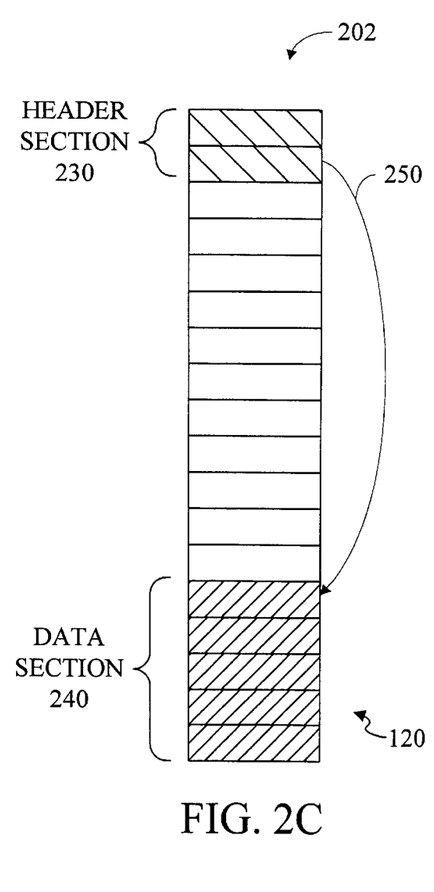

Referring now to FIGS. 2A–2C, the use of persistent object versioning mechanism 124 to effect versioning for persistent objects according to a preferred embodiment of the present invention is shown. In FIGS. 2A–2C, three separate instances of persistent object 125 are shown residing in portions of memory 120. In each instance, persistent object 125 has a header section 230, a data section 240, and a data pointer 250 in header section 230 which references data section 240. Persistent object 125 is shown at three different instances, instance A 200, instance B 201, and instance C 202, to fully demonstrate the present invention. It should be assumed that a version update has been performed by persistent object versioning mechanism 124 on persistent object 125 to cause reallocation of data section 240 as depicted between instance A 200 and instance B 201, and that another version update by persistent object versioning mechanism 124 has caused reallocation of data section 240 as depicted between instance B 201 and instance C 202.

As previously mentioned, the physical address of data section 240 of persistent object 125 does not necessarily follow the physical address of the last byte of header section 230. For purposes of illustration, it should be assumed that when a persistent object is initially created, header section 230 and data section 240 of persistent object 125 are located in consecutive physical locations within memory 120, as shown in memory 120 in instance A 200 of FIG. 2. In FIGS. 2A–2C, diagonal lines are used to shade and indicate portions of physical memory 120 occupied by persistent object 125. Also shown in FIGS. 2A–2C is data pointer 250 which references data section 240 of persistent object 125. Data pointer 250 serves to associate header section 230 of persistent object 125 with data section 240.

As further shown in FIGS. 2A–2C, the size of data section 240 in instance A 200 is smaller than the size of data section 240 in instance B 201. Data section 240 of instance A 200 occupies three physical locations in memory 120, whereas data section 240 in instance B 201 occupies four physical locations in memory 120. As previously mentioned, it should be assumed that a version update has caused the change in the size and location of data section 240 shown in instance A 200 and instance B 201. When a version update is performed, persistent object versioning mechanism 124 checks to see whether data section 240 as currently allocated for persistent object 125 is large enough to hold the new version of state data. If data section 240 as presently allocated for persistent object 125 is too small, persistent object versioning mechanism 124 creates a new data section 240.

As shown in FIG. 2B, in instance B 201, data section 240 of persistent object 125 has been relocated to occupy a different location in memory 120. It can be assumed that the locations in memory 120 immediately following data section 240 at instance A 200 are now occupied by some other type of data so that the new, larger version of data created by the persistent object versioning mechanism 125 cannot occupy these locations. As shown in instance B 201, data section 240 of persistent object 125 is no longer contiguously located after header section 230 of persistent object 125.

With further reference to instance B 201 of FIG. 2B, data pointer 250 has been updated to reference the relocated data section 240. Data pointer 250 serves to associate data section 240 of persistent object 125 with header section 230 of persistent object 125, regardless of the physical location of header section 230 and data section 240. As is shown in FIGS. 2A–2C, the header section of the persistent object still occupies the same location in memory 120, therefore persistent object 125 can still be referenced using its original object identity and existing object references will remain valid.

As shown for instance C 202 of persistent object 125 shown in FIG. 2C, another versioning update has taken place, requiring data section 240 to be relocated and data pointer 250 to be updated once again. In instance C 202 of FIG. 2C, data section 240 is larger than data section 240 shown in instance B 201, and since data section 240 has been relocated, it can be assumed that the locations in memory 120 immediately following data section 240 shown in instance B 201 were already in use. In conjunction with instance C 202, header section 230 still occupies the same location in memory 120 and still has the same object identity, therefore persistent object 125 can still be referenced using its original object identity and existing object references will remain valid.

Figure 3:
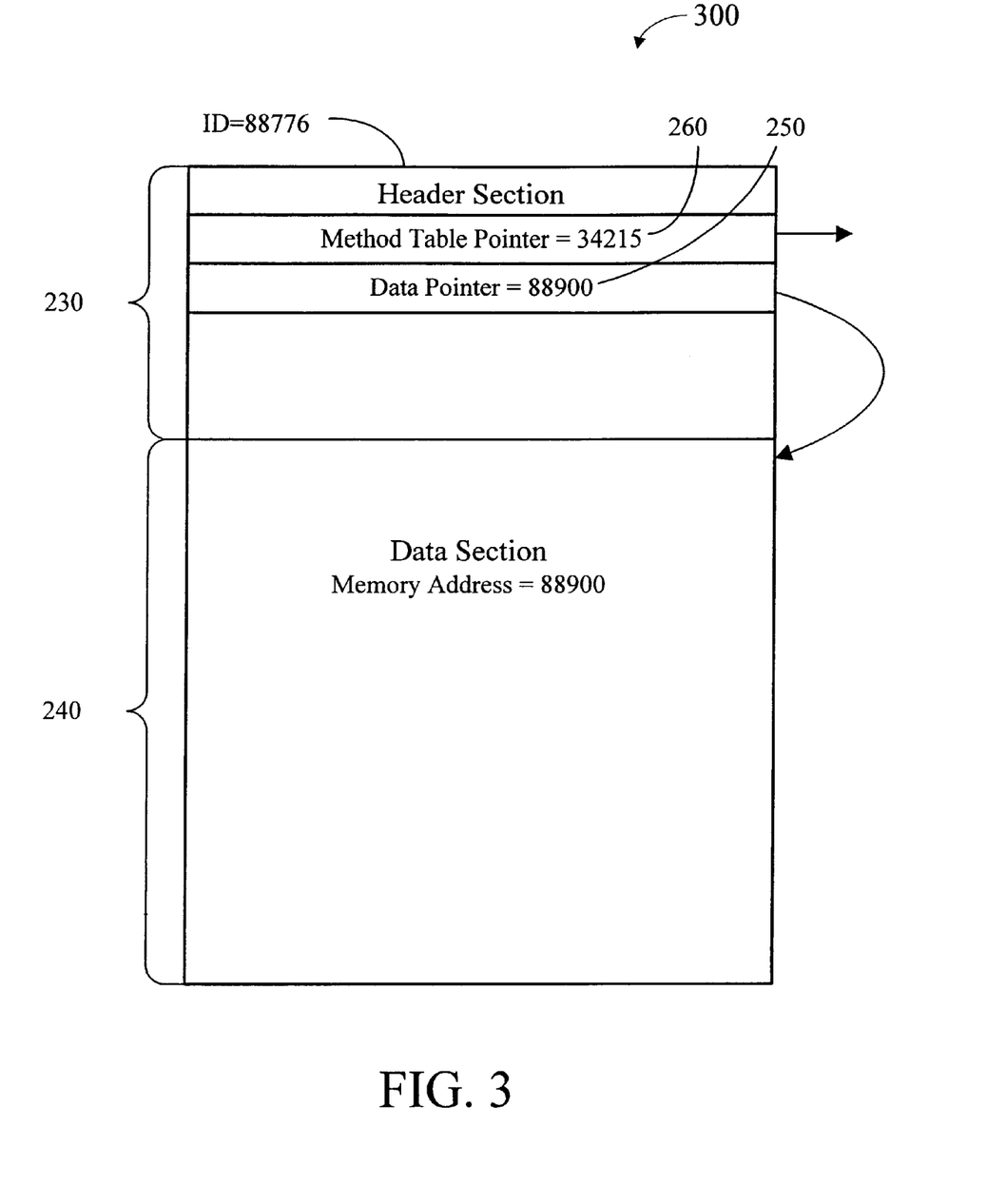
FIG. 3 is an object diagram showing a persistent object in accordance with a preferred embodiment of the present invention before a version update has been performed on the persistent object.
Figure 4:
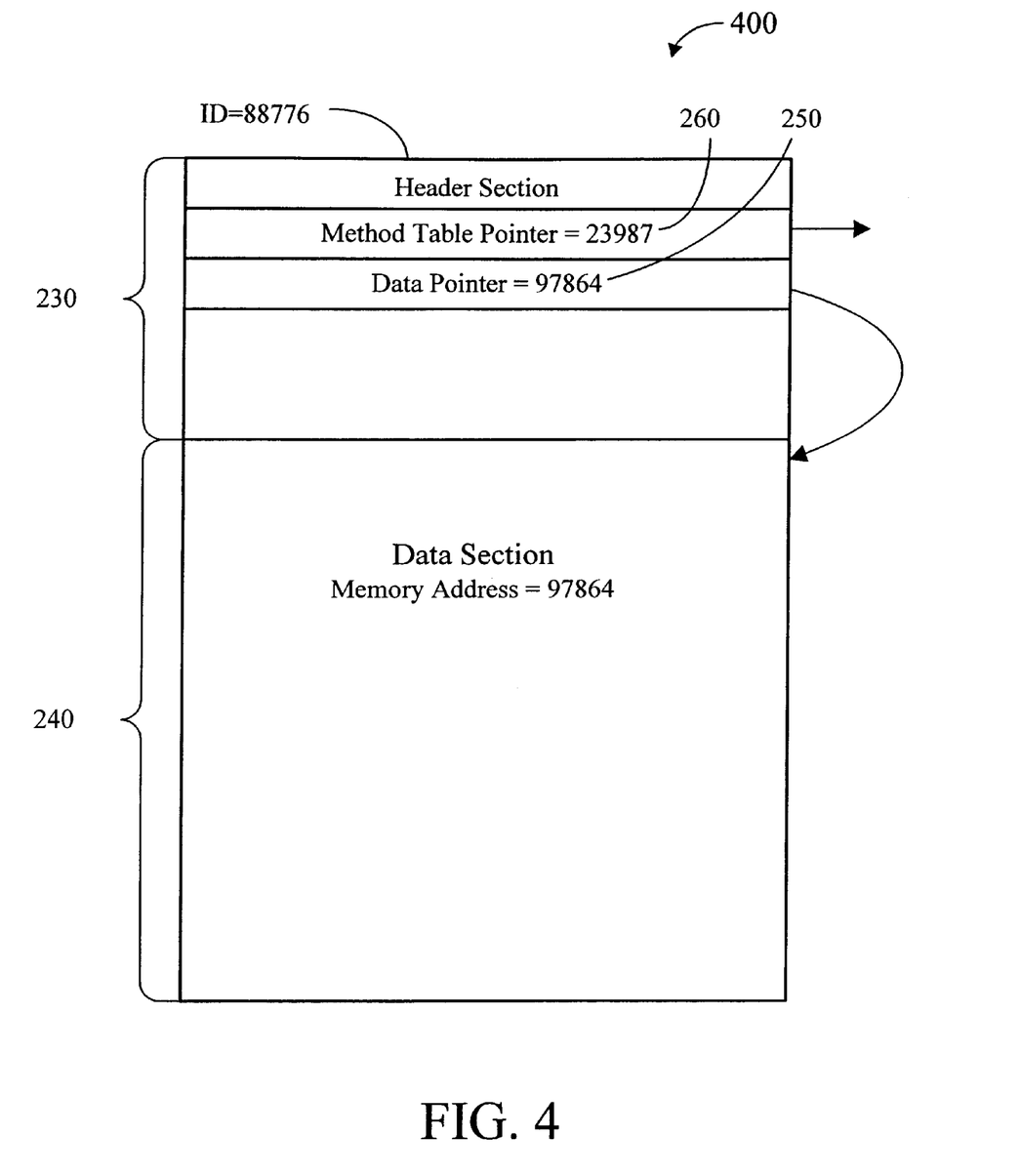
FIG. 4 is an object diagram depicting the persistent object of FIG. 3 after a version update of the persistent object in accordance with a preferred embodiment of the present invention.

Referring now to FIGS. 3 and 4, object diagrams will be used to further illustrate and demonstrate the applicability of the present invention. It should be assumed in the following examples that the object depicted is a persistent object such as persistent object 125 as shown in FIG. 1. It should also be assumed that existing related objects reference the persistent object in order to utilize the persistent data belonging to the object. The existing related objects have established pointers which reference the object identity of persistent object shown in FIGS. 3 and 4.

In FIG. 3, a persistent object 300 in accordance with a preferred embodiment of the present invention is shown. For purposes of demonstrating the applicability of the present invention, it should be assumed that a version update has not yet been performed on persistent object 300. As shown in FIG. 3, persistent object 300 includes a header section 230 and a data section 240. Header section 230 of persistent object 300 has a data pointer 250 to data section 240 of persistent object 300. As before, data pointer 250 serves to associate header section 230 with data section 240.

Typically, the identity of an object is equal to the physical memory address of some byte of the object. Existing related objects reference each other by referencing the physical address assigned to the object identity. The physical address assigned as the object identity is usually the virtual address of the beginning of the bytes allocated for the referenced object. Usually, in typical object environments, the header section of the object occupies the beginning of the bytes in memory allocated for the referenced object. Therefore, it can be assumed that the object identity is equal to the virtual address of the header section of the object when an object is first created. Existing related objects can reference a given persistent object by referencing the object identity of the persistent object, which corresponds to the physical location of the header section of the object.

In FIG. 3, existing related objects reference persistent object 300 using the physical address, i.e., the object identity. For the purpose of providing an example, it should be assumed that the physical address of header section 230 is 88776. Therefore, the object identity of persistent object 125 is 88776. Existing related objects reference the address assigned to the object identity in order to reference persistent object 300. Therefore, existing related objects can reference virtual address 88776 and, thereby, reference persistent object 300. The persistent object versioning mechanism of the present invention updates the version of a persistent object without changing the object identity of the persistent object. Since the identity of the object never changes, all references made to the versioned persistent object by existing related objects will always remain valid.

As previously mentioned, the present invention breaks the persistent object into sections. The header section has already been described, and the data section of the persistent object contains the state data belonging to the persistent object. Typical objects that do not contain persistent data, referred to in this specification as non-persistent objects, are not broken up into two sections. Rather, the complete contents (including the object identity and the data) of a non-persistent object are always stored in contiguous locations in memory. Therefore, existing related objects can reference the data section of a non-persistent object using the object identity assigned to the non-persistent object.

Using the methods of the present invention, the object identity of the persistent object is the same before a version update and after a version update. The persistent object versioning mechanism keeps the same object identity by only modifying the data section belonging to the persistent object. When the persistent object versioning mechanism executes, the mechanism checks to see whether the data section allocated for the persistent object is large enough to hold the new version of state data. If the data section allocated for the persistent object is too small, the persistent object versioning mechanism creates a new data section somewhere in memory.

The present invention breaks up the persistent object into two sections which may be, but are not necessarily, stored in consecutive locations in memory 120. Without a mechanism to associate the data section of the persistent object with the header section of the persistent object, existing related objects cannot access the data section of the persistent object by simply referencing the object identity of the persistent object (equal to the virtual address of the header section of the persistent object). The methods of the present invention includes the use of a data pointer to associate the data section belonging to the persistent object with the header section belonging to the persistent object. Since this data pointer links the header section of the persistent object with the data section of the persistent object, existing related objects can continually reference the data section of the persistent object using the object identity corresponding to the persistent object.

New data sections, which may be created during object version updates, can be associated with the persistent object by simply updating the data pointer in the header section of the persistent object to reference the new data section. Once the data pointer has been updated, the new version of the data section is associated with the header section via the data pointer. Existing related objects can reference the new version of the persistent object by using the same identity as before, i.e., by simply referencing the object identity assigned to the persistent object.

As shown in FIG. 3, header section 230 of persistent object 300 has a data pointer 250 that references data section 240 of persistent object 300, located at virtual memory address 88900. It should be assumed for purposes of demonstrating the present invention that header section 230 and data section 240 do not occupy contiguous locations in memory 120. Data pointer 250 associates data section 240 of persistent object 300 with header section 230 of persistent object 300. When an existing related object references the object identity of persistent object 300 (shown here as 88776), data pointer 250 provides a link between the data section 240 and header section 230 of persistent object 300, which allows an existing related object to effectively reference data section 240 of persistent object 300. Existing related objects access data section 240 of persistent object 300 by simply referencing the virtual address of header section 230 of persistent object 300 which has been assigned to the object identity.

As mentioned, the present invention divides the persistent object up into a header section and a data section. When the version of an object is updated or changed, the header section remains in its original location in memory 120, so that existing objects can reference the new version of the persistent object using the same object identity as the old version of the persistent object. Keeping the original object identity alleviates the need to update all existing references the to persistent object. When updating the version of the persistent object requires a new memory allocation, the memory is allocated and the data pointer in the header section is updated to point to the new data section. As mentioned, the header section of the persistent object always occupies the same virtual address in memory, even when the version of the object has been updated. Once the pointer in the header section is updated, existing related objects can reference the data section of the new version of the object using the object identity of the header.

Referring now to FIG. 4, object 300 is again shown, however, a new data section 240 has been created. This new data section 240 is located at a virtual address in memory 120 which is different from the original data section 240 (as shown in FIG. 2). Existing objects 210 still reference persistent object 300 using the same object identity (ID= 88776). However, data section 240, which is the new version of the data section for object 300, is now located at memory address 97864. Before the version update to persistent object 300, data section 240 was located at memory address 88900 as shown in FIG. 2. Data pointer 250 now references memory address 97864 to associate data section 240 with header section 230 of persistent object 300. Therefore, existing related objects 310 still reference object identity 88776, however, persistent object 300 is now associated with object identity 88776 and has an updated version of state data.

As shown in FIGS. 3 and 4, header section 230 may also contain a method table pointer 260. The method table pointer 260 points to, or references, a method table (not shown), and the version of the object instance may be determined by its method table pointer. The method table is stored independently from header section 230 and data section 240. The method table plus the object implementation (all the code to which the method table points) define the class version. If the data layout is changed (e.g.—fields are added or removed), it is usually necessary to change the code at the same time. Those skilled in the art will understand that the method table may be a complex structure combining a method table with other meta data in some implementations. In these implementations, the method table pointer would point to the combination of the method table and meta data.

Every instance of a class points to a particular method table. The method table defines a specific version of the class. Different versions of objects will point to different method tables. So a new "class version" is "created" when the new implementation is installed on a system. When a new implementation is installed on a system, a new method table is created (at a persistent address) for the new implementation or version. The old method table and the new method table coexist, but at different addresses. The version of the object instance is determined by its method table pointer because the method table pointer will either point to the new method table or the old method table. The method of updating method table pointer 260 is shown in FIGS. 3 and 4. In FIG. 3, method table pointer 260 has a value of 34215, meaning that the old method table (not shown) is located at virtual memory address 34215. This old method table defines the old version of persistent object 300. However, in FIG. 4, method table pointer 260 now references a different method table (not shown), located at virtual address 23987. This new method table defines the new version of persistent object 400.

Now that the physical description of persistent objects suitable for use in accordance with the preferred embodiments of the invention has been described, specific methods for performing version updates to persistent objects will be described. When describing the version update to a persistent object, this specification describes the object before the version update as the old object having old state data. This specification also describes the object after the version update as the new object having new state data. It should be understood that persistent object versioning mechanism 124 takes the old state of the persistent object and creates a new state, where the old state has old state data and the new state has new state data. For clarity, however, new state data and old state data will be mainly discussed, even though the persistent object is actually in a new or old state, respectively. This is true even when the new state data contained in the new version of the persistent object is substantially the same as the old state data contained in the old version of the persistent object.

Figure 5:
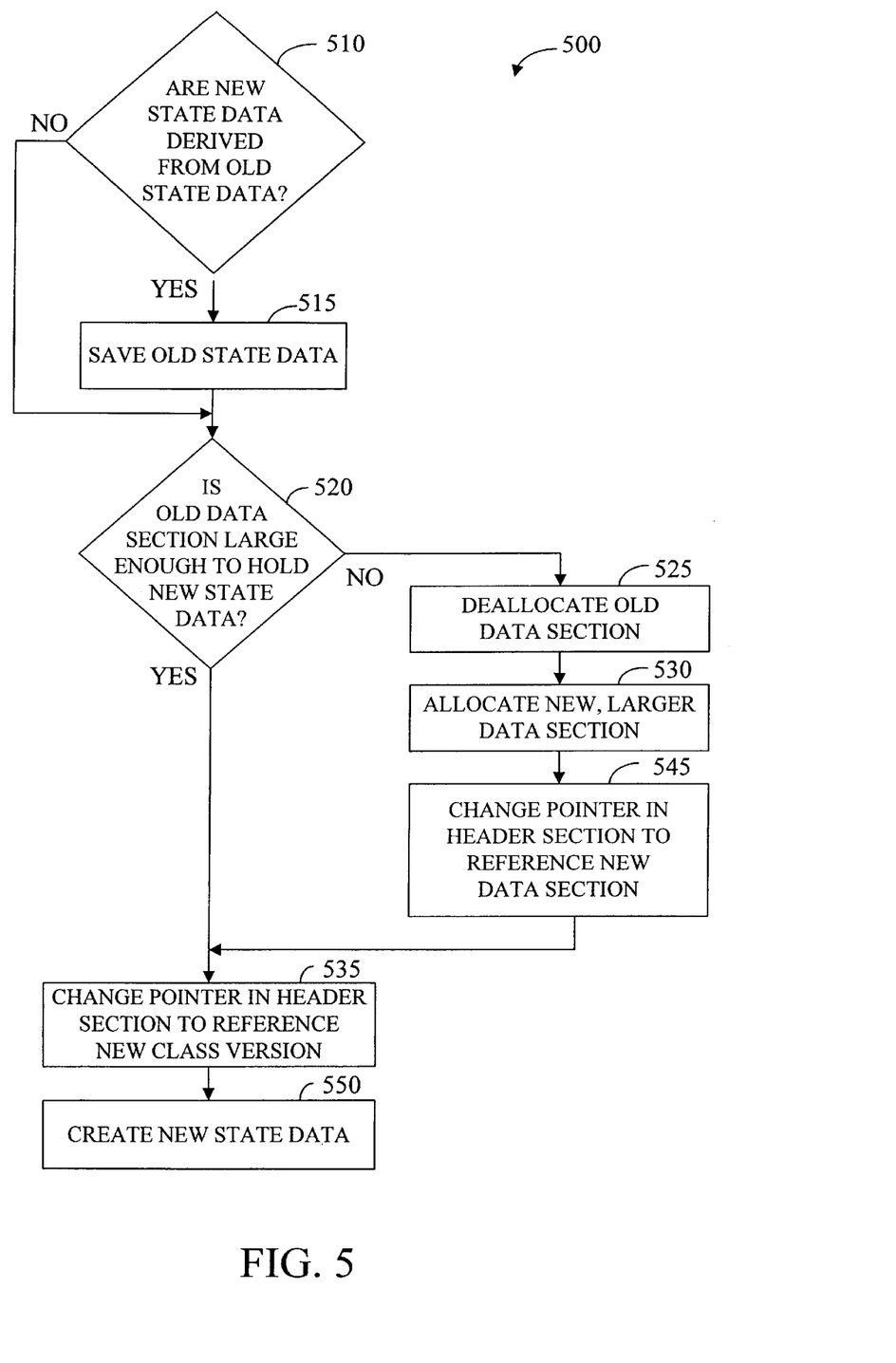
FIG. 5 is a flow diagram of a method for versioning a persistent object in accordance with a preferred embodiment of the present invention.

Referring now to FIG. 5, a method 500 for modifying or updating a version of a persistent object in accordance with a preferred embodiment of the present invention is shown.

Method 500 begins when the persistent object versioning mechanism determines whether the new state data will be derived from the old state data (step 510). If the new state data for the new version of the persistent object will be derived from the old state data (step 510=YES), persistent object versioning mechanism 124 saves the old state data into memory 120 (step 515). This may be accomplished by "streaming" the state data out into a byte array. Once the old state data has been saved into memory 120 (if necessary), the persistent object versioning mechanism determines whether the old data section is large enough to hold the new state data (step 520).

If the old data section is not large enough to hold the new state data (step 520=NO), the persistent object versioning mechanism deallocates the old data section (step 525), allocates a new larger data section sufficient for holding the new state data (step 530), and changes a pointer in the header section of the object to reference the new data section (step 545). If the mechanism determines that the old data section is large enough to hold the new state data (step 520=YES), the mechanism changes a pointer (method table pointer 260) in the header section to reference new class version (step 535). The new class version, as discussed previously, is defined by method table pointer 260. The persistent object versioning mechanism then creates new state data in accordance with the new class version (step 550).

When a version update is performed on a persistent object, new state data are created that are the updated versions of old state data. These new state data can be created in several different ways. For example, the old state data of the object can be modified to create the new state data or the original state data can be replaced by new state data. When modifying the old state data of the object, the old state data are used to build the new state data. When replacing the old state data of the object, the old state data are replaced with the new state data, and the old state data is simply lost.

Figure 6:
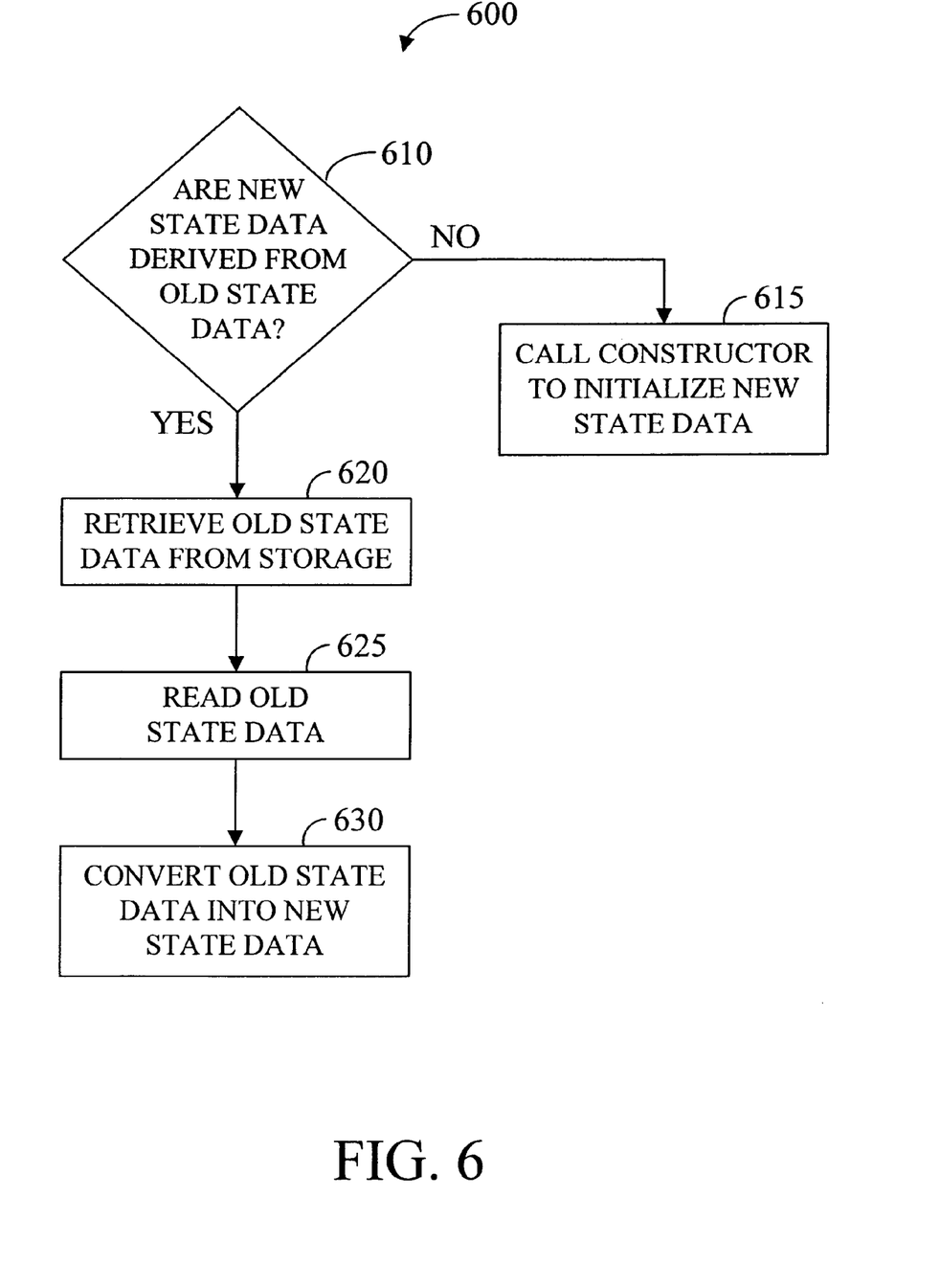
FIG. 6 is a flow diagram of a method for updating the version of the state of a persistent object in accordance with a preferred embodiment of the present invention.

Referring now to FIG. 6, a method 600 in accordance with a preferred embodiment of the present invention for creating new state data is shown. As shown in FIG. 6, the old state data contained within the data section of the persistent object may be modified to create the new state data. As previously mentioned, when modifying the state data of the persistent object, the old state data are used to build the new state data. The first step is to determine whether the new state data are derived from the old state data (step 610). If the new state data is not derived from the old state data (step 610=NO), the constructor object is simply called to initialize the new state data (step 615). A constructor object is an object which is capable of creating a new object according to a given class definition. If, however, the new state data are derived from the old state data (step 610=YES), the old state data must be retrieved from storage (step 620). This state data was originally placed in storage in FIG. 5, step 515. The old state data is read (step 625) and the old state data is converted into the new state data (step 630). Those skilled in the art will recognize that there are many techniques which may be employed to accomplish the conversion of the old state data into the new state data. For example, the old object may be "flattened" by streaming the state data out to a byte array in memory. Then after the new object has been created, the byte array may be streamed back into the state data of the new object, where the new object is of a different class than the old object. This is just one example and those skilled in the art will recognize that other techniques are available to accomplish the same results.

The embodiments and examples set forth herein were presented in order to best explain the present invention and its practical application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit of the forthcoming claims.

What is claimed is:

1. An apparatus comprising:
   a processor;
   a memory coupled to the processor;
   a persistent object residing in the memory, the persistent object having an object identity, a header section, and a first data section including a plurality of data fields, and wherein the header section further comprises a data pointer and a method table pointer referencing a first method table that defines a plurality of methods; and
   a persistent object versioning mechanism residing in the memory, the persistent object versioning mechanism updating the persistent object while maintaining the object identity of the persistent object by providing a second data section and a second method table, and by updating the data pointer to reference the second data section and by updating the method table pointer to reference the second method table thus providing the persistent object with new data as defined in the second data section and new methods as defined in the second method table while maintaining the object identify of the persistent object.

2. The apparatus of claim 1 wherein the second data section includes at least one new data field not found in the first data section.

3. The apparatus of claim 1 wherein the second data section includes at least one data field having a new type.

4. The apparatus of claim 1 wherein the persistent object versioning mechanism updates the persistent object a second time while maintaining the object identity of the persistent object by providing a third data section and a third method table, and by updating the data pointer to reference the third data section and by updating the method table pointer to reference the third method table, thus providing the persistent object with new data as defined in the third data section and new methods as defined in the third method table while maintaining the object identify of the persistent object.

5. The apparatus of claim 1 further comprising a plurality of persistent objects, each of the plurality of persistent objects belonging to a first class version and having an object identity, a header section, a first data section including a plurality of data fields, and wherein the header section further comprises a data pointer and a method table pointer, and wherein the persistent object versioning mechanism updates the plurality of objects belonging to a first class version to a second class version while maintaining the object identities of the plurality of persistent objects, the persistent object versioning mechanism updating the plurality of objects to the second class version by providing a second data section corresponding to each of the plurality of objects and by updating the data pointer in each of the plurality of objects to reference the corresponding second data section and by updating the method table pointer to reference the second method table, thus providing the plurality of persistent objects with new data as defined in the second data sections and new methods as defined in the second method table while maintaining the object identify of the plurality of persistent objects.

6. The apparatus of claim 1 wherein the first data section resides in a first memory location and wherein the second data section resides in a second memory location.

7. The apparatus of claim 6 wherein the first memory location and the second memory location are non-contiguous.

8. The apparatus of claim 1 wherein the second data section has a different size than the first data section.

9. The apparatus of claim 1 wherein the second data section includes at least one new data field not found in the first data section and wherein the second method table includes at least one new method to operate upon the at least one new data field.

10. An apparatus comprising:
a processor;
a memory coupled to the processor;
a plurality of persistent objects residing in the memory, each of the plurality of persistent objects belonging to a first class version, and each of the plurality of persistent objects comprising a first data section and a header section, each header section including a data pointer referencing the first data section, and a method table pointer referencing a first method table and wherein each of the plurality of objects has an object identity; and
a persistent object versioning mechanism residing in the memory, wherein the persistent object versioning mechanism updates the plurality of persistent objects to a second class version while maintaining the object identities of the plurality of persistent objects, the persistent object versioning mechanism updating the plurality of objects to a second class version by providing a second data section corresponding to each of the plurality of persistent objects and by updating the data pointer in each of the plurality of persistent objects to reference the corresponding second data section and by updating the method table pointer to reference a second method table, thus providing the plurality of persistent objects with new data as defined in the second data sections and new methods as defined in the second method table while maintaining the object identify of the plurality of persistent objects.

11. The apparatus of claim 10 wherein the second data section corresponding to each of the plurality of persistent objects each includes at least one data field having a new type.

12. The apparatus of claim 10 wherein the second data section corresponding to each of the plurality of persistent objects each includes at least one new data field not found in the first data section.

13. The apparatus of claim 10 wherein the second data section corresponding to each of the plurality of persistent objects has a different size than the first data section corresponding to each of the plurality of persistent objects.

14. A method for updating a persistent object from a first version to a second version, the method comprising the steps of:
allocating a new data section for the persistent object;
providing a new method table for the persistent object, the new method table defining at least one new method for the persistent object;
updating a method table pointer contained in a header section of the persistent object from a first method table to the second method table;
updating a data pointer contained in the header section of the persistent object from a first data section to the new data section.

15. The method of claim 14 further comprising the step of transferring state data to the new data section and wherein the step of transferring state data to the new data section comprises the step of streaming a byte array containing previously saved state data from a memory location into the new data section.

16. The method of claim 14 wherein the step of allocating a new data section for the persistent object comprises the step of allocating a portion of memory which is larger than a previously created data section and wherein the new data section is non-contiguous with the header section such that the header portion is separated in the memory from the data portion by data unrelated to the persistent object.

17. The method of claim 14 wherein the second version of the persistent object has new state data, the first version of the persistent object has old state data, and wherein the step of allocating a new data section comprises the steps of:
determining if the new state data are derived from the old state data;
saving the old state data if the new state data are derived from the old state data; and
creating new state data.

18. The method of claim 17 wherein the step of determining if the new state data are derived from the old state data further comprises the steps of:
determining if the first data section is large enough to hold the new state data;
and
performing the following steps if the first data section is not large enough to hold the new state data:
i) deallocating the first data section;
ii) allocating a new data section that is large enough to hold the new state data.

19. The method of claim 17 wherein the step of creating new state data comprises the steps of:
calling a constructor object to initialize the new state data if the new state data are not derived from the old state data; and
performing the following steps if the new state data are derived from the old state data:
i) retrieving the old state data;
ii) reading the old state data; and
iii) converting the old state data into the new state data.

20. A method for versioning a persistent object to a new version, the new version having new state data, the persistent object having old state data, an old data section and a header section, the old data section storing the old state data, the header section having a data pointer referencing the old data section, the method comprising the steps of:
a) determining if the new state data are derived from the old state data;
b) saving old state data if the new state data are derived from the old state data;
c) determining if the old data section is large enough to hold the new state data;
d) performing the following steps if the old data section is not large enough to hold the new state data:
ii) deallocating the old data section;
ii) allocating a new data section that is large enough to hold the new state data; and
iii) changing the data pointer to reference the new data section;
e) creating new state data; and
f) updating a method table pointer contained in the header section of the persistent object from a first method table to a second method table, the second method table defining at least one new method of the persistent object.

21. The method of claim 20 wherein the step of creating new state data comprises the steps of:
   calling a constructor to initialize the new state data if the new state data are not derived from the old state data; and
   performing the following steps if the new state data are derived from the old state data:
   i) retrieving the old state data;
   ii) reading the old state data; and
   iii) converting the old state data into the new state data.

22. A program product comprising:
   a persistent object versioning mechanism, the persistent object versioning mechanism updating a plurality of persistent objects from a first class version to a second class version while maintaining an object identity for each of the plurality of persistent objects, each of the plurality of persistent objects having an object identity, a data section, and a header section including a data pointer and a method table pointer referencing a first method table, the persistent object versioning mechanism updating the plurality of persistent objects to the second class version by providing a corresponding second data section for each of the plurality of persistent objects and a second method table, and by updating the data pointer to reference the corresponding second data section and by updating the method table pointer to reference the second method table, thus providing the plurality of persistent objects with new data as defined in the second data sections and new methods as defined in the second method table while maintaining the object identify of each of the plurality of persistent objects; and
   signal bearing media bearing the persistent object versioning mechanism.

23. The program product of claim 22 wherein the signal bearing media comprises transmission media.

24. The program product of claim 22 wherein the signal bearing media comprises recordable media.

25. The program product of claim 22 wherein the second data section corresponding to each of the plurality of persistent objects each includes at least one new data field not found in the first data section.

26. The program product of claim 22 wherein the second data section corresponding to each of the plurality of persistent objects each includes at least one new data field having a new type.

27. A program product for updating a persistent object from a first version to a second version, the program product comprising:
   a persistent object versioning mechanism, the persistent object versioning mechanism updating a persistent object to a new version, the persistent object including an object identity, a first data section and a header section, wherein the header section includes a data pointer referencing the first data section and a method table pointer referencing a first method table, the persistent object versioning mechanism updating the persistent object to a new version by providing a second data section and a second method table, and by updating the data pointer to reference the second data section and updating the method table pointer to reference the second method table, thus providing the persistent object with new data as defined in the second data section and new methods as defined in the second method table while maintaining the object identity of the persistent object; and
   signal bearing media bearing the persistent object versioning mechanism.

28. The program product of claim 27 wherein the signal bearing media comprises transmission media.

29. The program product of claim 27 wherein the signal bearing media comprises recordable media.

30. The method of claim 27 wherein the second data section includes at least one data field not found in the first data section.

31. The method of claim 27 wherein the second data section includes at least one data field having a new type.

32. The method of claim 27 wherein the persistent object versioning mechanism updates the persistent object a second time while maintaining the object identity of the persistent object by providing a third data section and a third method table, and by updating the data pointer to reference the third data section and by updating the method table pointer to reference the third method table, thus providing the persistent object with new data as defined in the third data section and new methods as defined in the third method table while maintaining the object identify of the persistent object.

33. The method of claim 27 wherein the second data section includes at least one new data field not found in the first data section and wherein the second method table includes at least one new method to operate upon the at least one new data field in the second data section.

34. The program product of claim 27 wherein the header section is located in a first memory location and the second data section is located in a second memory location, and wherein the first memory location and the second memory location are noncontiguous such that the header portion is separated in the memory from the second data portion by data unrelated to the persistent object.

* * * * *